(12) United States Patent
Suzuki et al.

(10) Patent No.: US 7,900,993 B2
(45) Date of Patent: Mar. 8, 2011

(54) VEHICLE DOOR SASH STRUCTURE

(75) Inventors: Nobuji Suzuki, Tokyo (JP); Takaaki Kobayashi, Tokyo (JP); Tomoyuki Nunome, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 176 days.

(21) Appl. No.: 12/023,565

(22) Filed: Jan. 31, 2008

(65) Prior Publication Data
US 2009/0195013 A1    Aug. 6, 2009

(51) Int. Cl.
*B60J 5/04*    (2006.01)

(52) U.S. Cl. .................... 296/146.5; 296/146.2; 49/502; 49/441

(58) Field of Classification Search ................. 296/201, 296/146.2, 146.3, 146.5; 49/502, 479.1, 49/441
See application file for complete search history.

(56) References Cited

U.S. PATENT DOCUMENTS

| | | | | |
|---|---|---|---|---|
| 5,735,081 A | * | 4/1998 | Yamanaka et al. | 49/502 |
| 5,743,047 A | * | 4/1998 | Bonne et al. | 49/490.1 |
| 6,112,470 A | * | 9/2000 | Hashimoto et al. | 49/502 |
| 6,416,113 B1 | * | 7/2002 | Page | 296/146.2 |
| 6,425,209 B1 | * | 7/2002 | Park | 49/502 |
| 6,641,204 B2 | * | 11/2003 | Ogawa et al. | 296/146.9 |
| 6,840,565 B2 | * | 1/2005 | Masunaga et al. | 296/146.5 |
| 2006/0181107 A1 | * | 8/2006 | Nishikawa | 296/146.2 |
| 2007/0262607 A1 | * | 11/2007 | Saito | 296/146.2 |
| 2008/0116713 A1 | * | 5/2008 | Jun et al. | 296/146.2 |
| 2008/0265615 A1 | * | 10/2008 | Eguchi et al. | 296/146.2 |
| 2009/0038232 A1 | * | 2/2009 | Kimoto | 49/502 |
| 2009/0152894 A1 | * | 6/2009 | Kang | 296/146.9 |

FOREIGN PATENT DOCUMENTS

| | | |
|---|---|---|
| JP | 7-89347 | 4/1995 |
| JP | 11-334367 | 12/1999 |
| JP | 11-334385 | 12/1999 |
| JP | 2007-320484 | 12/2007 |
| JP | 2008-114725 | 5/2008 |

* cited by examiner

*Primary Examiner* — Jason S Morrow
(74) *Attorney, Agent, or Firm* — Smith, Gambrell & Russell LLP

(57) ABSTRACT

A vehicle door sash structure 100 is configured to include a door sash 110 that extends along an edge of a vehicle door window glass 4 and has a closed cross-section portion 111 and a projecting surface portion 112 that projects from the closed cross-section portion 111 toward the outside in the vehicle width direction, a molding 120 that extends substantially along the door sash 110 and is arranged as exposed to the outside of the vehicle, a clip 130 that is made of an elastic material, is fixed to the inner surface of the molding 120 and nips the projecting surface portion 112 of the door sash 110, a convex portion that is formed so as to project from either one of the clip 130 and the door sash 110 to the other one, and a concave portion 113 that is formed at the other one and with which the convex portion is engaged.

22 Claims, 6 Drawing Sheets

VEHICLE DOOR SASH STRUCTURE

BACKGROUND OF THE INVENTION

1. Field of the Invention

The present invention relates to a door sash structure of a vehicle such as an automobile, and more particularly to a hidden-type door sash structure in which substantially entire width of the sash is covered by a molding.

2. Description of the Related Arts

A sash (window frame) that extends along the outer peripheral edge portion of a door window glass for supporting the glass is provided at the door window glass of a vehicle such as an automobile. It has been known that a designed (decorative) molding is attached to the sash in order to enhance appearance quality.

A door sash structure of a hidden type has been proposed in which a substantially entire door sash is covered by a molding and a weather strip when the door sash is viewed from the outside of the vehicle, so that the main body of the door sash is not exposed to the outside. As a prior art, Japanese Patent Application Laid-Open No. 11-334367 discloses a door sash structure of a hidden type in which a molding is fixed to a flat portion, which is formed to be protruded from the main body of the sash, by a rivet.

In the hidden-type door sash structure, it is desirable that the width of the molding is reduced as much as possible in order to enhance appearance quality. However, in a case where the molding is fixed to the door sash with a rivet or a screw as in the above-mentioned prior art, the used rivet or screw projects from the mounting surface portion of the sash, so that it is necessary to increase a width of the molding to some extent according to the size.

When the molding is fixed by a rivet or a screw, it takes much working time in a vehicle assembly line, which causes a problem of deteriorating productivity.

In view of the above-mentioned problems, an object of the present invention is to provide a vehicle door sash structure that can reduce a width of a molding and that is excellent in assembling workability.

SUMMARY OF THE INVENTION

The present invention is to solve the above-mentioned problems, and, according to a first aspect, a molding mounting structure of a vehicle door sash includes a door sash that extends along an edge portion of a vehicle door window glass and has a closed cross-section portion and a projecting surface portion that projects from the closed cross-section portion toward the outside in the vehicle width direction; a molding that extends substantially along the door sash and is arranged being exposed to the outside of the vehicle; and a clip that is fixed to the inner surface of the molding and nips the projecting surface portion of the door sash so as to fix the molding to the door sash.

According to a second aspect, the molding mounting structure of a vehicle door sash according to the first aspect includes locking means for maintaining the locked state of the door sash and the clip with the door sash nipped by the clip.

According to a third aspect, in the molding mounting structure of a vehicle door sash according to the second aspect, the locking means includes a convex portion that is formed so as to project from either one of the clip and the door sash to the other one of the clip and the door sash, and a concave portion that is formed at the other one of the clip and the door sash and is engaged with the convex portion, and the concave portion and the convex portion maintain the locked state of the door sash and the clip with the door sash nipped by the clip.

According to a fourth aspect, in the molding mounting structure of a vehicle door sash according to the third aspect, the convex portion is formed to the clip, and the concave portion is formed to the closed cross-section portion of the door sash.

According to a fifth aspect, in the molding mounting structure of a vehicle door sash according to the first aspect, the clip includes an engagement surface portion that is engaged with a folded portion formed at an edge portion of the molding in the width direction.

According to a sixth aspect, in the molding mounting structure of a vehicle door sash according to the first aspect, the clip includes biasing means that is in pressed contact with an edge portion of the projecting surface portion of the door sash for biasing the clip toward the direction in which the clip is pulled out of the projecting surface portion.

According to a seventh aspect, in the molding mounting structure of a vehicle door sash according to the first aspect, the molding has a side face portion that is exposed to the outside of the vehicle and a mounting surface portion that projects toward the inside in the vehicle width direction from the side face portion, wherein the mounting surface portion of the molding and the clip are fixed.

According to an eighth aspect, the molding mounting structure of a vehicle door sash according to the first aspect includes a glass run for supporting an outer peripheral edge portion of the door window glass, wherein the glass run is fitted into a groove enclosed by the door sash, the molding and the clip, and a projecting portion that projects toward the inside of the groove is formed to the clip.

The effects described below can be obtained according to the present invention.

(1) Since the clip that nips the projecting surface portion of the door sash protrudes from the projecting surface portion only by about the thickness of the material, the size of the projecting surface portion of the molding fixing portion in the normal direction can be reduced, compared to the prior art using, for example, a rivet or a screw. Therefore, the width of the molding can be reduced. Furthermore, since the molding can be fixed to the door sash only by nipping the door sash with the clip, the molding can be easily and efficiently mounted to the door sash.

(2) In addition to the nipping of the door sash by the clip, the clip is fixed to the door sash by locking means composed of a concave portion or a convex portion of the door sash and a convex portion or a concave portion of the clip. Therefore, when mounting the molding, the clip is pushed and elastically deformed, whereby the molding can be mounted with one-touch operation, and the molding is prevented from being fallen off, after the mounting, thanks to the engagement between the convex portion and the concave portion. Therefore, the assembling workability of the door sash structure can be enhanced.

Furthermore, the mounting strength of the molding can be enhanced by the aforesaid configuration, so that the supporting rigidity of the glass run supporting the door window glass can also be increased when the glass run is provided on the molding, with the result that it is possible to prevent the door window glass from being sucked out during a high-speed traveling. In this case, the mounting strength can further be enhanced by the configuration in which the convex portion is formed to the clip and the concave portion is formed to the closed cross-section portion of the door sash.

(3) According to the configuration in which the clip has the molding engagement portion that is engaged with the folded portion at the end portion of the molding, the leaning of the molding (the turning or twisting about a shaft substantially in the longitudinal direction) can be prevented, whereby the appearance quality can further be enhanced.

(4) Since the clip has the biasing means that comes in pressed contact with the edge portion of the projecting surface portion of the door sash for biasing the clip in the direction in which the clip is drawn out of the projecting surface portion, shakiness caused by the dimensional difference between the convex portion and the concave portion which engage the clip and the door sash is eliminated. Therefore, the surface precision of the surface of the molding is enhanced, resulting in further enhanced appearance quality.

(5) The glass run is fitted in the groove enclosed by the door sash, the molding, and the clip, and the projecting portion projecting in the groove is formed to the clip. Therefore, when the window glass is fully closed, the peripheral edge of the door window glass comes in pressed contact with the bottom portion of the glass run, so that the bottom portion of the glass run slightly rises between the surrounding of the door window glass and the projecting portion. By virtue of this rising, the window glass can be held at a predetermined position. Accordingly, the vibration of the door window glass during the traveling can be prevented.

DETAILED DESCRIPTION OF THE PREFERRED EMBODIMENT

In a vehicle door sash structure according to an embodiment of the present invention, which can reduce the width of a molding and is excellent in assembling workability, a U-shaped clip made of a sheet metal is fixed to the inner surface of the molding, a projecting surface portion projecting from the door sash is nipped by the clip, and the projection of the clip is engaged with a hole on the projecting surface portion.

Figure 1:
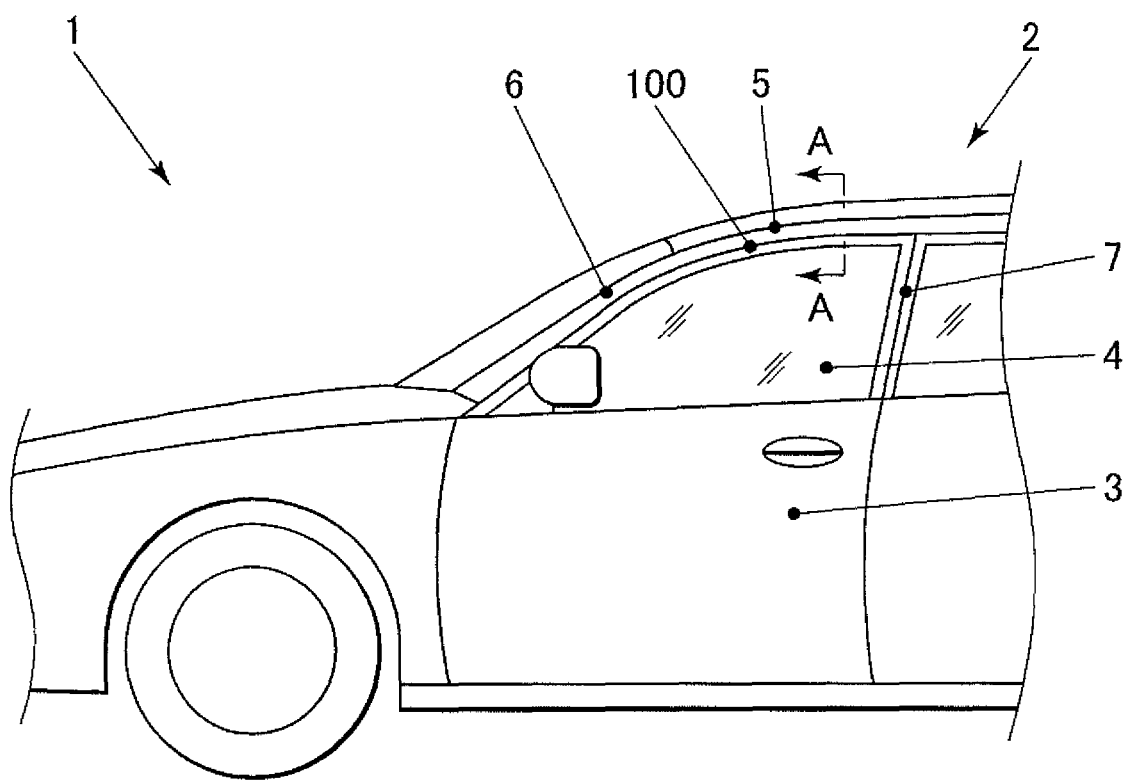
FIG. 1 is a schematic side view of a vehicle to which an embodiment of a vehicle door sash structure according to the present invention is applied.

An embodiment of the vehicle door sash structure according to the present invention will be explained below. FIG. 1 is a schematic side view of a vehicle to which the door sash structure of the present embodiment is applied. A vehicle 1 is, for example, a passenger car, and includes a cabin 2, door 3, door window glass 4, side roof frame 5, A pillar 6, B pillar 7, and door sash portion (door sash structure) 100.

The cabin (vehicle compartment) 2 has a space in which a passenger or the like is accommodated. The door 3 is attached to a door opening, provided at the side portion of the cabin 2, so as to be capable of opening and closing. The door window glass 4 is a plate-like tempered glass mounted so as to be raised and lowered with respect to the door 3. The door window glass 4 is arranged to, when raised, project from the upper portion of the door 3 so as to close the upper portion of the door opening. The door window glass 4 has a substantially trapezoid shape, as viewed from the side of the vehicle, in which its front edge portion and rear edge portion are formed in accordance with the slope of the A pillar 6 and the B pillar 7.

The side roof frame 5 is a closed cross-section portion constituting the side end portion of the roof of the cabin 2, and extends in the front-rear direction of the vehicle along the upper edge portion of the door window glass 4 in its raised position.

The A pillar 6 is a pillar-like closed cross-section portion supporting the front end portion of the roof 5, and is arranged as nipped between the side edge portion of the front window glass and the front edge portion of the door window glass 4. The B pillar 7 is a pillar-like closed cross-section portion supporting the middle part of the side roof frame 5 in the front-rear direction, and extends substantially along the rear edge portion of the door 3 and the door window glass 4. The side roof frame 5, A pillar 6, and B pillar 7 are formed by, for example, pressing a steel plate so as to constitute a part of a monocoque structure of the vehicle.

Figure 2:
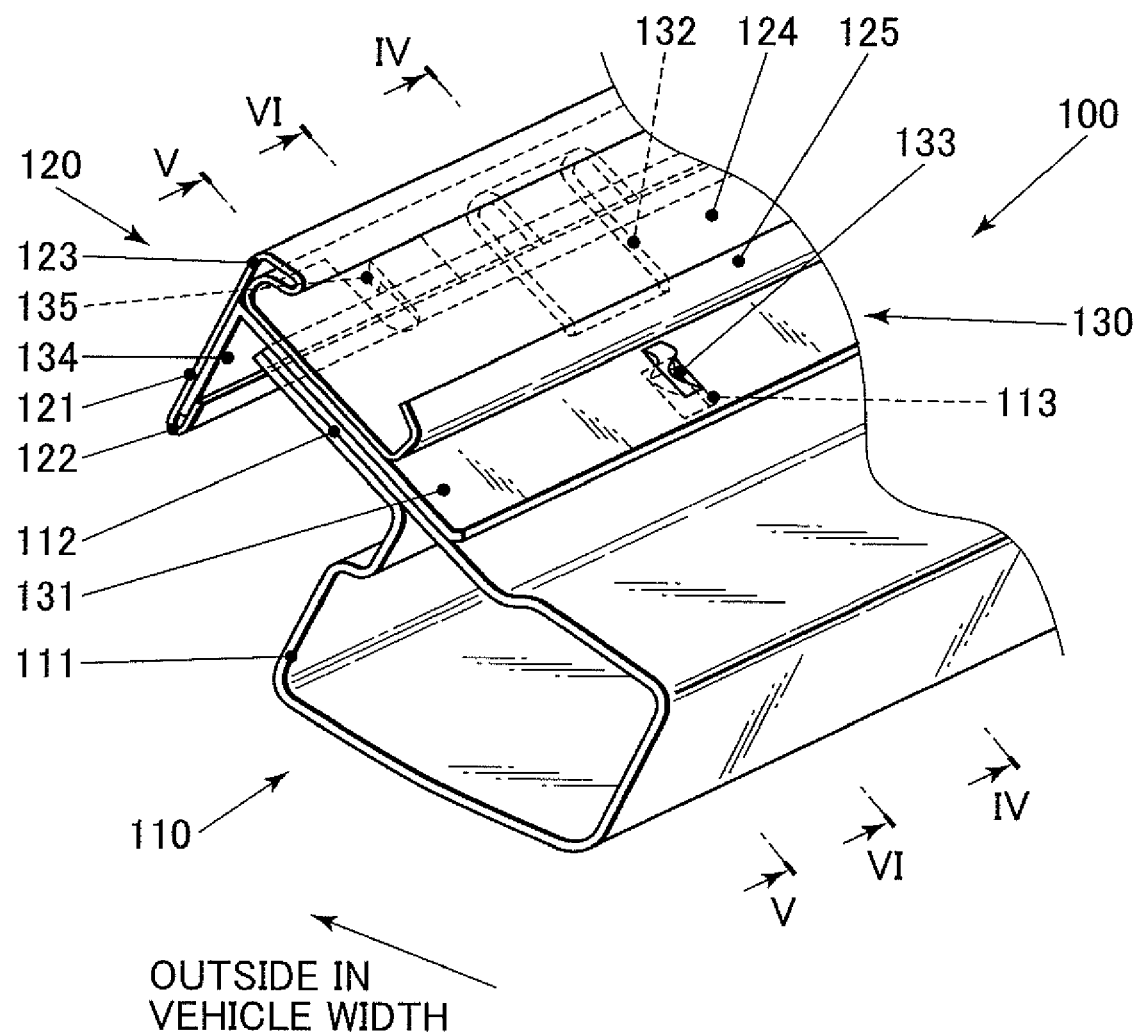
FIG. 2 is a cross-sectional view of the door sash structure according to the embodiment.
Figure 3:
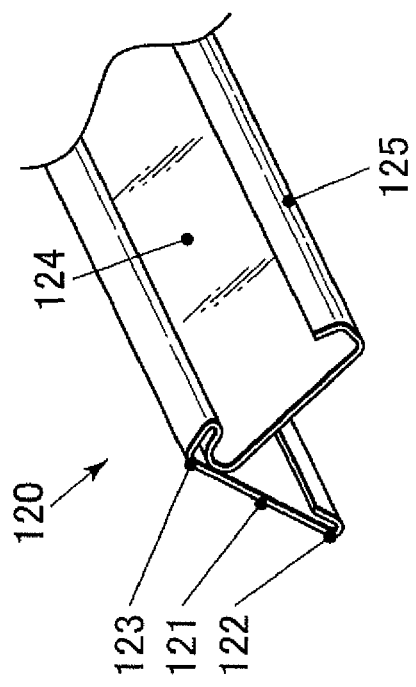
FIG. 3 is an exploded perspective view of the door sash structure according to the embodiment.
Figure 3:
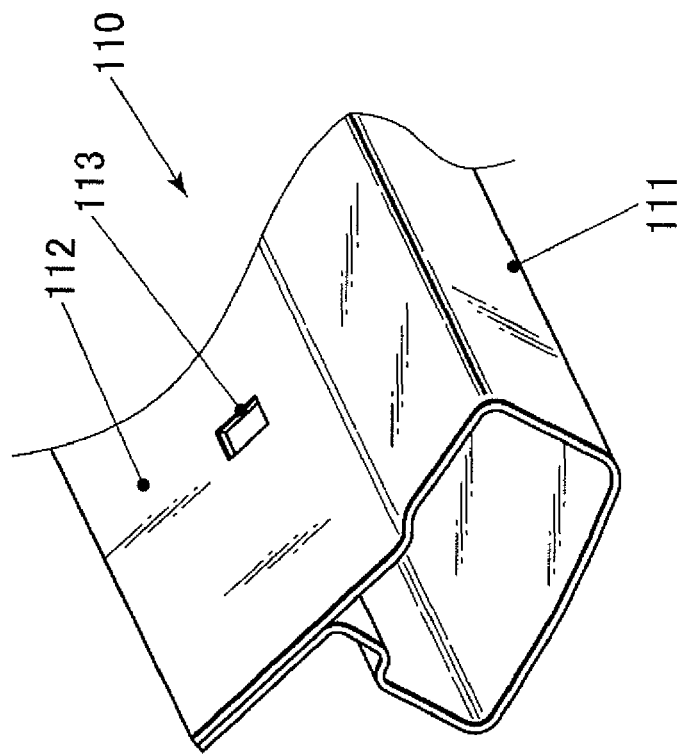
Figure 3:
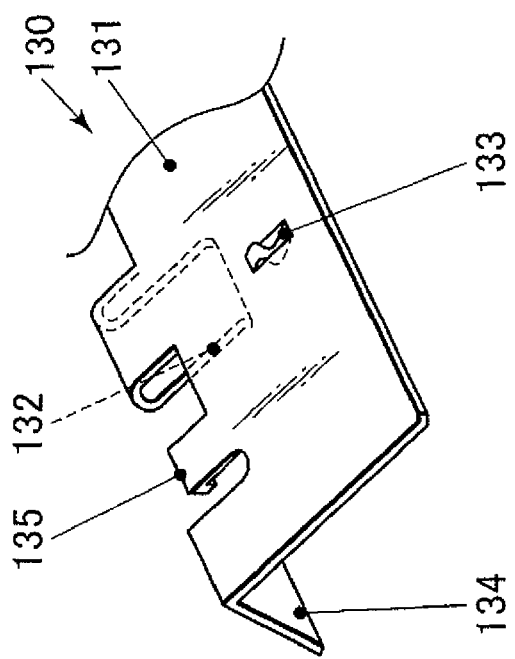
Figure 4:
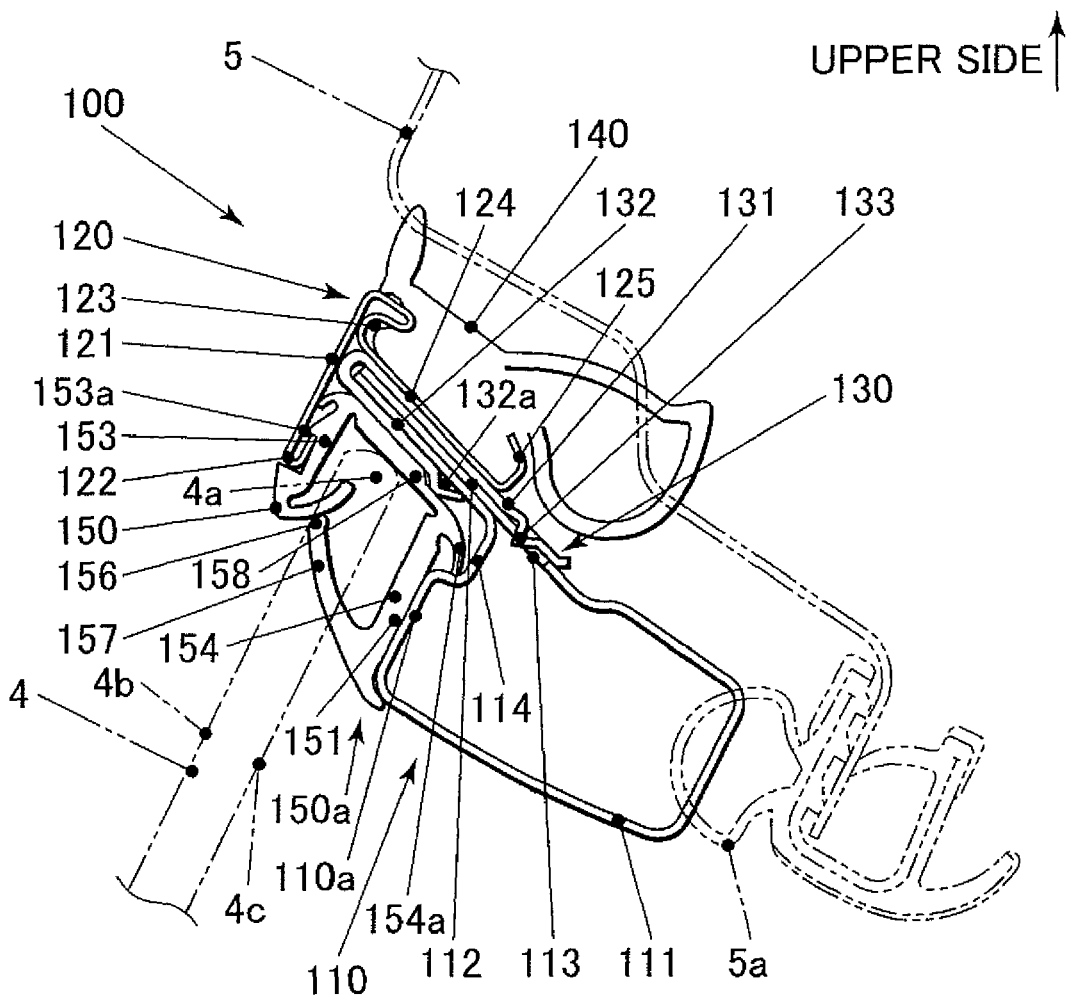
FIG. 4 is a sectional view of IV-IV portion in FIG. 2 seen in the direction of an arrow.
Figure 5:
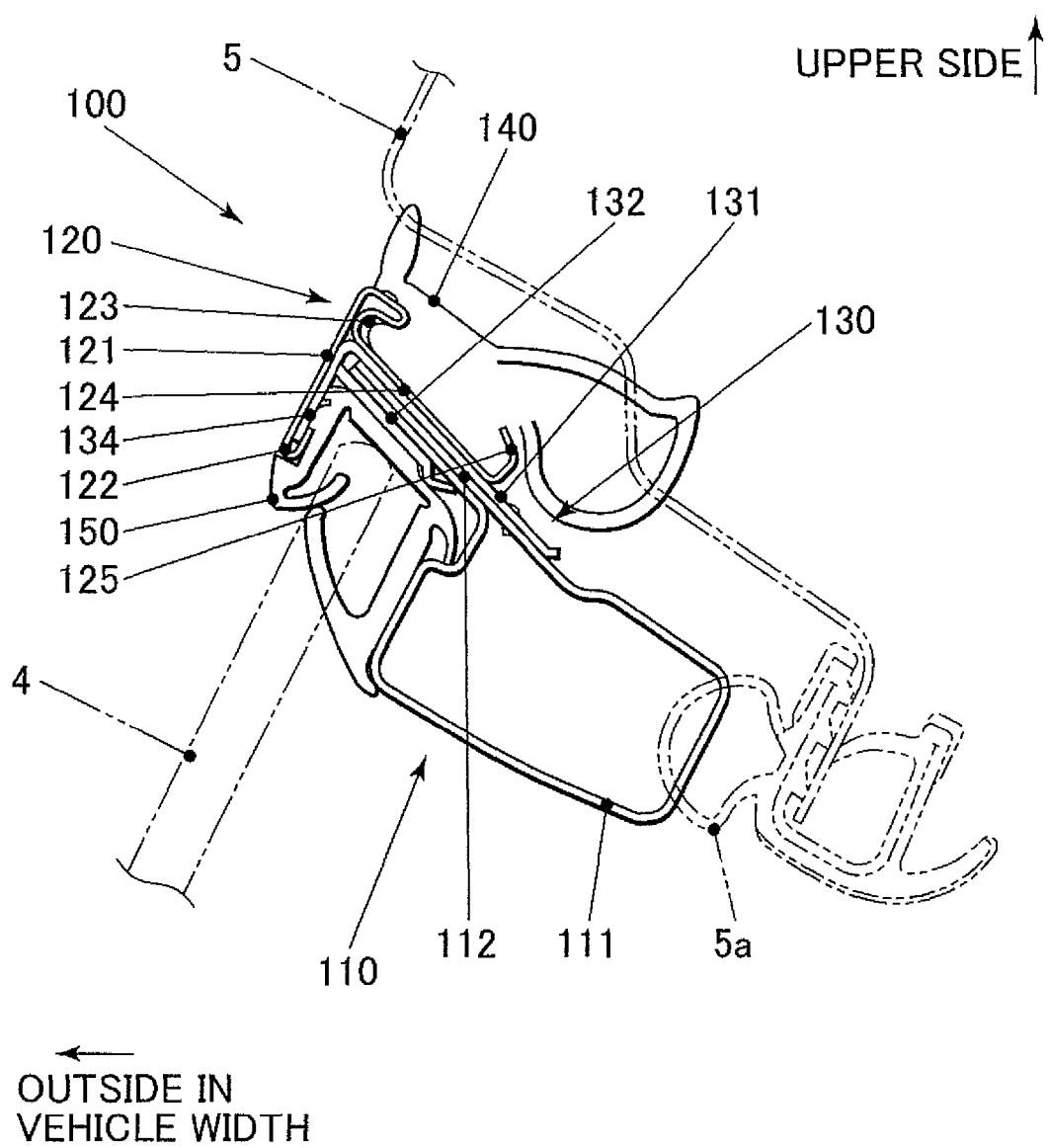
FIG. 5 is a sectional view of V-V portion in FIG. 2 seen in the direction of an arrow.
Figure 6:
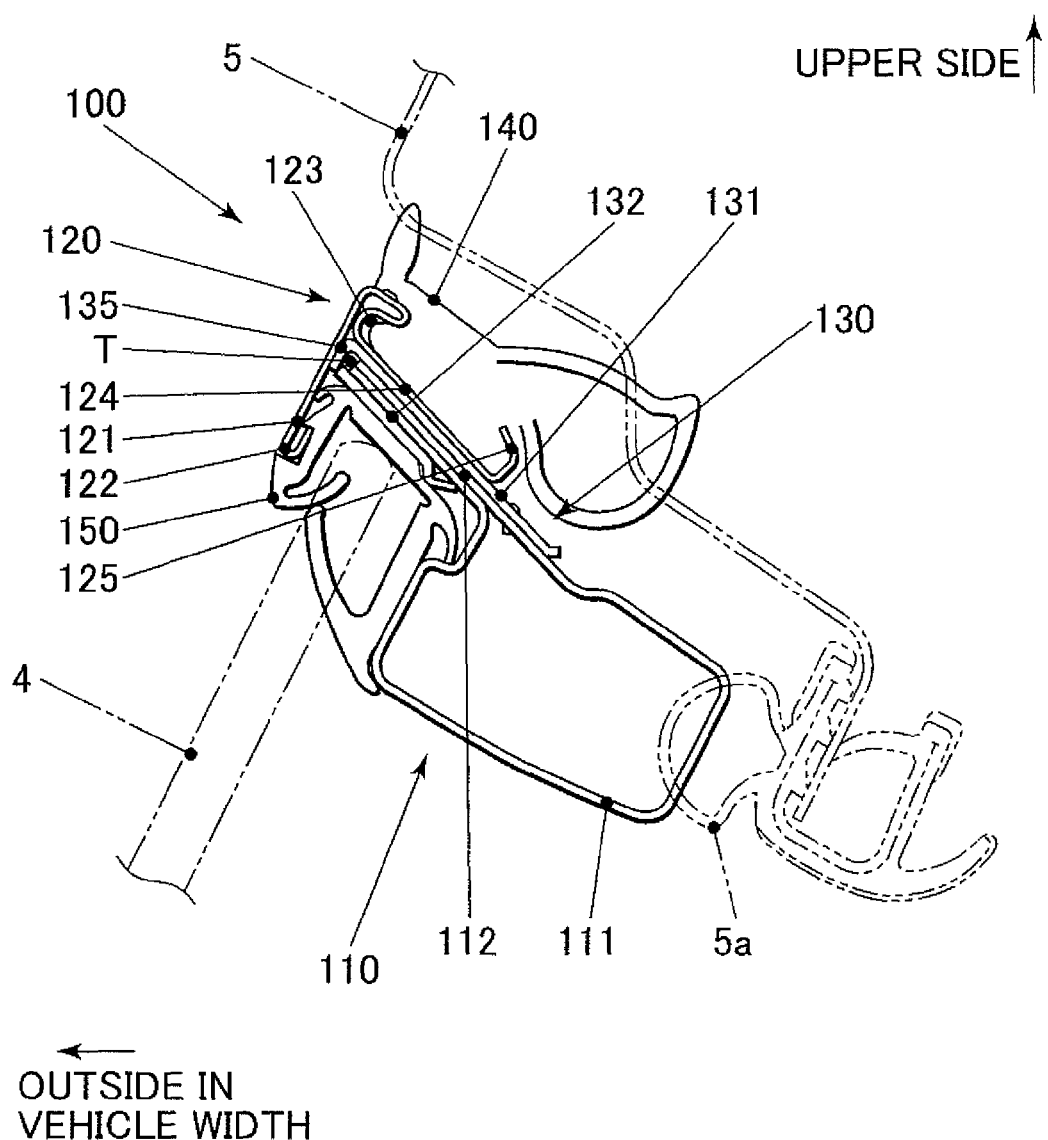
FIG. 6 is a sectional view of VI-VI portion in FIG. 2 seen in the direction of an arrow.

The door sash portion 100 is a window frame that extends substantially along the front edge portion, upper edge portion, and rear edge portion of the door window glass 4 in its raised position for supporting the door window glass 4. The structure of the door sash portion 100 will be explained below in detail. FIG. 2 is a perspective sectional view of the door sash portion 100. FIG. 2 is a view of the door sash portion 100 taken along a line A-A in FIG. 1 seen from the diagonally rear side at the diagonally upper side. FIG. 3 is a view showing the exploded door sash portion 100 in FIG. 2. In FIGS. 2 and 3, a weather strip and a glass run, described later, are not shown. FIGS. 4, 5 and 6 are sectional views of IV-IV portion, V-V portion and VI-VI portion in FIG. 2 seen in the directions of arrows.

The door sash portion 100 includes a door sash main body 110, a molding 120, a clip 130, a weather strip 140, and a glass run 150. The door sash main body 110 is a frame-like member extending along the outer peripheral edge portion of the door window glass 4 for supporting the door window glass 4. It has a closed cross-section portion 111, a projecting surface portion 112, an opening 113 and a glass run locking portion 114.

The closed cross-section portion 111 is formed such that its cross-sectional shape, cut in the plane orthogonal to the longitudinal direction of the door sash main body 110, is substantially a rectangular. The direction of the long side of the closed cross-section portion 111 is arranged to incline as shown in FIG. 4 and other figures in such a manner that the long side at the outer side of the vehicle width direction becomes higher than the long side at the inner side thereof. The end face of the closed cross-section portion 111 at the outer side in the vehicle width direction is arranged to oppose to the upper end portion of the surface portion, on the side of the vehicle compartment, of the door window glass 4 in the raised position. On the other hand, the end face of the closed cross-section portion 111 at the inner side in the vehicle width direction comes in contact with the door weather strip 5a mounted to the roof side frame 5 so as to prevent the intrusion of water or the like into the vehicle compartment from the upper portion of the door sash portion 100. An opening (concave portion) 113 that is engaged with a later-described engagement projection 133 of the clip 130 is formed at the upper surface of the closed cross-section portion 111. The opening 113 is formed into a rectangular shape, and formed through the upper surface of the closed cross-section portion 111.

The projecting surface portion 112 is a plate-like portion that is formed to be projected outwardly in the vehicle width direction and upwardly from the upper end portion of the closed cross-section portion 111 at the outer side in the vehicle width direction. The doors ash main body 110 is formed by, for example, roll-forming a single steel plate. The projecting surface portion is composed by closing the portions corresponding to both end portions of the band plate, serving as a material, in the widthwise direction (the direction orthogonal to the longitudinal direction). The upper surface of the projecting surface portion 112 constitutes a plane continuous to the region of the upper surface of the closed cross-section portion 111 at the outer side in the vehicle width direction, wherein the aforesaid opening 113 is formed in this plane. The glass run locking portion 114 is formed in a stepped shape along the upper edge of the outer face 110a of the closed cross-section portion 111.

The molding 120 is a designed (decorative) component provided by covering the door sash main body 110 at the outer side in the vehicle width direction. For example, the molding 120 is formed by roll-forming a steel plate, and a surface treatment such as a painting, plating, etc. is performed thereto. The molding 120 is attached at a region, of the door sash portion 100, for example adjacent to the front edge portion and upper edge portion of the door window glass 4. The molding 120 includes a side face portion 121, a lower folded portion 122, an upper folded portion 123, a mounting surface portion 124, and an inner folded portion 125. These are integrally formed by the aforesaid roll forming.

The side face portion 121 is a surface portion exposed to the outer surface of the vehicle. It is formed into a substantially plane band plate shape. The lower folded portion 122 is a portion obtained by folding the lower end portion of the side face portion 121 in a U-shape toward the inner side in the vehicle width direction. The U-shaped groove is open upward. The upper folded portion 123 is a portion obtained by folding the upper end portion of the side face portion 121 toward the inner side of the vehicle width direction and folding the inner surface of the side face portion 121 such that the cross-sectional shape becomes substantially an S-shape. The mounting surface portion 124 is a plate-like portion formed so as to project toward the inner side in the vehicle width direction and diagonally downward from the lower end portion of the upper folded portion 123. The inner folded portion 125 is a portion formed by folding the end portion of the mounting surface portion 124 at the inner side in the vehicle width direction upwardly for supporting the weather strip 140 from the inner side in the vehicle width direction.

The clip 130 fixes the molding 120 to the door sash main body 110. It is formed by, for example, punching and pressing a steel plate. As shown in FIG. 3 and other figures, the clip 130 includes a flat plate portion 131, a nipping portion 132, an engagement projection 133, a molding engagement portion 134, and a foam tape holding portion 135, and these are integrally formed.

The flat plate portion 131 is a portion fixed to the mounting surface portion 124 by a spot welding with the upper surface of the flat plate portion 131 coming in contact with the tower surface of the mounting surface portion 124 of the molding 120. As shown in FIG. 2 and other figures, in the state in which the door sash structure is assembled, the flat plate portion 131 is arranged such that its lower surface comes in contact with the upper surface of the projecting surface portion 112 of the door sash main body 110 and the region, at the side of the projecting surface, of the upper surface of the closed cross-section portion 111. The end portion of the flat plate portion 131 at the inner side in the vehicle width direction projects from the end portion of the mounting surface portion 124 of the molding 120 at the inner side in the vehicle width direction.

The nipping portion 132 is formed by folding the region of a band plate shape, which projects from the end portion of the flat plate portion 131 at the outer side in the vehicle width direction and is punched, to the lower side of the flat plate portion 131. As shown in FIG. 4 and other figures, the flat plate portion 131 and the nipping portion 132 have a substantially U-shape viewed in the longitudinal direction of the door sash portion 100. The projecting surface portion 112 of the door sash main body 110 is inserted into the groove of the U-shaped inner surface to be nipped. In order to facilitate the mounting to the door sash main body 110, the leading end portion of the nipping portion 132 (the end portion at the inner side in the vehicle width direction) is folded diagonally downwardly so as to guide the edge portion of the projecting surface portion 112 when inserting the projecting surface portion 112 between the flat plate portion 131 and the nipping portion 132. A bead-like projection 132a is formed along the leading end of the nipping portion 132.

The engagement projection 133 is formed by projecting a part of the flat plate portion 131 downwardly by press work. This engagement projection 133 is inserted into the opening 113 of the door sash main body 110 for engagement, thereby preventing the clip 130 from falling off (slipping off) from the door sash main body 110 after the mounting.

The molding engagement portion (molding leaning preventive portion) 134 is an end portion at the outside of the flat plate portion 131 in the vehicle width direction, and is a plate-like surface portion formed so as to project downwardly from the section separated from the nipping portion 132 in the longitudinal direction of the door sash portion 100. As shown in FIG. 5 and other figures, the lower end portion (leading end portion) of the molding engagement portion 134 is inserted into the lower folded portion 122 of the molding 120 in the state in which the door sash portion 100 is assembled.

The foam tape holding portion 135 is a plate-like surface portion formed so as to project downwardly from the region between the nipping portion 132 and the molding engagement portion 134 in the longitudinal direction of the door sash portion 100 and at the outer edge of the flat plate portion 131 in the vehicle width direction. As shown in FIG. 6, the foam tape holding portion 135 is arranged to be opposite to the edge of the projecting surface portion 112 of the door sash main body 110 with a space. A foam tape T is held as compressed between the edge of the projecting surface portion 112 and the foam tape holding portion 135. The foam tape T is an elastic foam sealing member whose material is, for example, polyvinyl chloride, urethane, rubber-based material, etc. It is formed into a tape-shape (strip-shape) such that the sectional shape orthogonal to the longitudinal direction is substantially rectangle. An adhesive is applied on a part of the side face of the foam tape T, so that the clip 130 is adhered onto the foam tape holding portion 135 due to its adhesive force.

The weather strip 140 prevents intrusion of water or the like into a vehicle compartment from a gap between the upper portion of the door sash portion 100 and the side roof frame 5. It is made of a rubber-based material or the like, and fitted between the upper folded portion 123 and the inner folded portion 125 of the molding 120.

The glass run 150 is arranged along the inner peripheral portion of the door sash portion 100 for supporting the outer peripheral portion of the door window glass 4 such that the door window glass 4 is capable of being raised and lowered, and for preventing the intrusion of water or the like from the outer peripheral portion of the door window glass 4. The glass run 150 is made of a rubber-based material or the like, and is fitted into a glass run mounting groove 150a that is formed between the lower folded portion 122 of the molding 120 and the side face of the closed cross-section portion 111 of the door sash main body 110, and that has a section of substantially a C shape. The glass run 150 has a base 151 having a section of substantially a C shape and provided with a bottom portion 158 coming in contact with the nipping portion 132 and serving as the bottom surface of the glass run mounting groove 150a, an outer side portion 153 coming in contact with the side face portion 121 of the molding 120, and an inner side portion 154 coming in contact with the outer face 110a of the door sash main body 110. An outer seal portion 156 is formed at the edge of the outer side portion 153, while an inner seal portion 157 is formed at the edge of the inner side portion 154. A locking portion 153a that is locked to the lower folded portion 122 is projectingly provided in a bead-like format the outer side portion 153 of the base 151, while a locking portion 154a that is locked to the glass run locking portion 114 is projectingly provided in a bead-like form at the inner side portion 154.

The assembling method of the above-mentioned vehicle door sash structure will subsequently be explained. Firstly, the clip 130 is fixed to the molding 120. At this time, the molding engagement portion 134 of the clip 130 is inserted and fitted into the lower folded portion 122 of the molding 120. The clip 130 is fixed to the molding 120 by spot-welding the flat plate portion 131 to the mounting surface portion 124 of the molding 120.

The projecting surface portion 112 of the door sash main body 110 is pushed in between the flat plate portion 131 and the nipping portion 132 of the clip 130, whereby the nipping portion 132 nips the projecting surface portion 112, and hence, the molding 120 and the clip 130 are mounted to the door sash main body 110. At this time, the engagement projection 133 of the clip 130 is inserted into the opening 113 of the door sash main body 110 to be engaged therewith. The length of the opening 113 in the vehicle width direction is formed to be slightly longer than the length of the engagement projection 133 in the vehicle width direction, considering the dimensional tolerance and assembling workability. However, since the elastic force caused by the compression of the foam tape T biases the clip 130 in the direction in which the clip 130 is drawn out of the projecting surface portion 112 of the door sash main body 110, the engagement projection 133 is brought closer to the outer side in the vehicle width direction in the opening 113.

The glass run 150 is fitted and mounted to the glass run mounting groove 150a in such a manner that the base 151 is inserted into the glass run mounting groove 150a so as to bring the bottom portion 158 into contact with the nipping portion 132, bring the outer side portion 153 into contact with the side face portion 121 of the molding 120 and bring the inner side portion 154 into contact with the outer surface 110a of the door sash main body 110, and that the locking portion 153a is locked to the lower folded portion 122 and the locking portion 154a is locked to the glass run locking portion 114. For mounting the glass run 150, the shape of the nipping portion 132 forming the bottom portion of the glass run mounting groove 150a is continuous with the sectional shape substantially the same in the extending direction of the glass run mounting groove 150a, whereby a local projecting portion is not formed. Therefore, the glass run 150 can be easily and stably mounted to the glass run mounting groove 150a without causing a uplift of the bottom portion 158 of the glass run 150.

The present embodiment provides the effects described below.

(1) The flat plate portion 131 and the nipping portion 132 of the clip 130 that nips the projecting surface portion 112 of the door sash main body 110 protrude from the projecting surface portion 112 only by about the thickness of the steel plate, which is a material of these components. Therefore, compared to the conventional technique for fixing the molding to the door sash main body by means of a rivet or a screw, for example, the size of the projecting surface portion of the molding fixing portion in the normal direction can be reduced, whereby the width of the side face portion 121 of the molding 120 can be reduced. Accordingly, the design property around the door sash is enhanced, and the field of vision from the vehicle compartment is enlarged. The clip 130 is made of a steel plate having elasticity, and has the engagement projection 133 engaged with the opening 113 of the door sash main body 110. By virtue of this configuration, when mounting the molding 120, the clip 130 is pushed and elastically deformed, whereby the nipping portion 132 is opened with respect to the flat plate portion 131; thus, the molding 120 can be mounted with one-touch operation, and the molding 120 is prevented from being fallen off, after the mounting, thanks to the engagement between the engagement projection 133 and the opening 113. Therefore, the assembling workability of the door sash portion 100 can be enhanced. Furthermore, the mounting strength of the molding 120 to the door sash main body 110 can be increased by the aforesaid configuration, so that the supporting rigidity of the glass run 150 can also be increased, with the result that it is possible to prevent the door window glass 4 from being sucked out during a high-speed traveling.

(2) According to the configuration in which the clip 130 has the molding engagement portion 134 that is engaged with the lower folded portion 122 of the molding 120, the leaning of the molding 120 can be prevented, whereby the appearance quality can further be enhanced.

(3) Since the clip 130 has the foam tape T that comes in pressed contact with the edge portion of the projecting surface portion 112 of the door sash main body 110 for biasing the clip 130 in the direction in which the clip 130 is drawn out of the projecting surface portion 112, shakiness caused by the dimensional difference between the engagement projection 133 and the opening 113 is eliminated. Therefore, the surface precision of the side face 121 of the molding 120 is enhanced, resulting in further enhanced appearance quality.

(4) Since the molding 120 comes in direct contact with the glass run 150 at its inner surface for holding the same, the surface dimensional difference between the side face 121 and the surface of the door window glass 4 can be reduced. Accordingly, the appearance quality and aerodynamic characteristics can be enhanced.

(5) The projection 132a that projects in a bead-like form in the glass run mounting groove 150a along the tip edge is formed in the vicinity of the tip end of the nipping portion 132. Therefore, during the closing operation of the door window glass 4, the outer surface 4b of the surrounding 4a of the rising door window glass 4 comes in sliding contact with the outer seal portion 156, and the inner surface 4c is inserted between the outer seal portion 156 and the inner seal portion 157 while coming in sliding contact with the inner seal portion 157. When the door window glass 4 is fully closed, the surrounding 4a of the door window glass 4 comes in pressed contact with the bottom portion 158 of the glass run 150, by which the press-contact portion is slightly recessed by compression and deformation, and the deformation is restricted by the bead-like projection 132a of the nipping portion 132, so that the bottom portion 158 slightly rises between the surrounding 4a of the door window glass 4 and the projection 132a. The surrounding 4a of the door window glass 4 is biased toward the outer seal portion 156 of the glass run 150 due to this rising, whereby the door window glass 4 can be held at a predetermined position set beforehand. Accordingly, the surrounding 4a of the door window glass 4 is water-tightly sealed, and the vibration of the door window glass 4 during the traveling or the like can be prevented.

Furthermore, the shape of the nipping portion 132 that forms the bottom portion of the glass run mounting groove 150a is formed continuous with the substantially same sectional shape in the extending direction of the glass run mounting groove 150a. Therefore, when the door window glass 4 is fully closed, the surrounding 4a uniformly comes in pressed contact with the bottom portion 158 of the glass run 150 over a wide area, whereby there is no local press-contact. Accordingly, the bottom portion 158 of the glass run 150 is not locally worn, and hence, the durability of the glass run 150 is enhanced and the stable function of the glass run 150 can be maintained.

Modifications

The present invention is not limited to the embodiment described above, and various modifications and changes are possible, wherein these modifications and changes are included in the technical scope of the present invention.

(1) Although the molding and clip are fixed by the spot welding in the embodiment, the present invention is not limited thereto. For example, they may be fixed by bonding or other fixing methods.

(2) In the embodiment, the foam tape is arranged between the projecting surface portion of the door sash main body and the foam tape holding portion of the clip so as to prevent the shakiness of the engagement portion by the elasticity of the foam tape. Instead of arranging the foam tape, a pressing portion that is formed integral with the clip for pressing the projecting surface portion by its elasticity (spring force) may be provided. By virtue of this configuration, the number of components can be reduced, whereby the door sash structure can be simplified.

(3) Although the convex portion is formed at the molding and the concave portion is formed at the door sash in the embodiment wherein these concave and convex portions work together as a locking means for preventing the molding from falling off, the present invention is not limited thereto. The concave portion may be formed at the molding, and the convex portion may be formed at the door sash.

(4) In the embodiment, the nipping portion 132 of the clip 130 nips the projecting surface portion 112, and the engagement projection 133 is inserted into the opening 113 for engagement. However, both ends of the clip 130 may be bonded to the lower portion of the door sash main body 110 by means of bonding means such as a screw, whereby the clip 130 can surely be fixed to the door sash main body 110 stably.

What is claimed is:

1. A molding mounting structure of a vehicle door sash, comprising:
   a door sash that extends along an edge portion of a vehicle door window glass and has a closed cross-section portion and a projecting surface portion that projects from the closed cross-section portion toward the outside in the vehicle width direction;
   a molding that extends substantially along the door sash and is arranged being exposed to the outside of the vehicle; and
   a clip that is fixed to the inner surface of the molding and, wherein the clip includes an engagement surface portion engaged with the molding and a nipping portion nipping the projecting surface portion of the door sash so as to fix the molding to the door sash, and
   wherein the engagement surface portion is provided adjacent to the nipping portion in a longitudinal direction of the door sash.

2. The molding mounting structure of a vehicle door sash according to claim 1, further comprising:
   locking means for maintaining the locked state of the door sash and the clip with the door sash nipped by the clip.

3. The molding mounting structure of a vehicle door sash according to claim 2, wherein
   the locking means includes a convex portion that is formed so as to project from either one of the clip and the door sash to the other one of the clip and the door sash, and a concave portion that is formed at the other one of the clip and the door sash, and is engaged with the convex portion, and
   the concave portion and the convex portion maintain the locked state of the door sash and the clip with the door sash nipped by the clip.

4. A molding mounting structure of a vehicle door sash comprising:
   a door sash that extends along an edge portion of a vehicle door window glass and has a closed cross-section portion and a projecting surface portion that projects from the closed cross-section portion toward the outside in the vehicle width direction;
   a molding that extends substantially along the door sash and is arranged being exposed to the outside of the vehicle;
   a clip that is fixed to the inner surface of the molding and nips the projecting surface portion of the door sash so as to fix the molding to the door sash; and
   a locking means for maintaining the locking state of the door sash and the clip with the door sash nipped by the clip, said locking means includes a convex portion formed to the clip and a concave portion formed to the closed cross-section of the door sash and engaged with the convex portion, and the concave portion and the convex portion maintain the locked state of the door sash and the clip with the door sash nipped by the clip.

5. The molding mounting structure of a vehicle door sash according to claim 1, wherein
   the engagement surface portion of the clip is engaged with a folded portion formed at an edge portion of the molding in the width direction.

6. The molding mounting structure of a vehicle door sash according to claim 1, wherein
   the clip includes biasing means that is in pressed contact with an edge portion of the projecting surface portion of the door sash for biasing the clip toward the direction in which the clip is pulled out of the projecting surface portion.

7. The molding mounting structure of a vehicle door sash according to claim 1, wherein
   the molding has a side face portion that is exposed to the outside of the vehicle and a mounting surface portion that projects toward the inside in the vehicle width direction from the side face portion, wherein the mounting surface portion of the molding and the clip are fixed.

8. The molding mounting structure of a vehicle door sash according to claim 1, further comprising:
   a glass run for supporting an outer peripheral edge portion of the door window glass, wherein
   the glass run is fitted into a groove enclosed by the door sash, the molding and the clip, and a projecting portion that projects toward the inside of the groove is formed to the clip.

9. A molding mounting structure of a vehicle door sash, comprising:
a door sash that extends along an edge portion of a vehicle door window glass and has a closed cross-section portion and a projecting surface portion that projects from the closed cross-section portion toward the outside in the vehicle width direction;
a molding that extends substantially along the door sash and is arranged being exposed to the outside of the vehicle;
a clip that is fixed to the inner surface of the molding and nips the projecting surface portion of the door sash so as to fix the molding to the door sash,
wherein the clip includes biasing means that is in pressed contact with an edge portion of the projecting surface portion of the door sash for biasing the clip toward the direction in which the clip is pulled out of the projecting surface portion, and
wherein said biasing means includes an adhesive material adhering said clip to the projecting surface portion of said door sash.

10. A molding mounting structure of a vehicle door sash, comprising:
a door sash that extends along an edge portion of a vehicle door window glass and has a closed cross-section portion and a projecting surface portion that projects from the closed cross-section portion toward the outside in the vehicle width direction;
a molding that extends substantially along the door sash and is arranged being exposed to the outside of the vehicle;
a clip that is fixed to the inner surface of the molding and nips the projecting surface portion of the door sash so as to fix the molding to the door sash,
wherein the clip includes biasing means that is in pressed contact with an edge portion of the projecting surface portion of the door sash for biasing the clip toward the direction in which the clip is pulled out of the projecting surface portion, and
wherein said biasing means comprises an elastic foam material.

11. The molding mounting structure of a vehicle door sash according to claim 3 wherein said concave portion includes an opening formed in said other one of the clip and the door sash.

12. The molding mounting structure of a vehicle door sash according to claim 1 wherein said projecting surface portion includes a support surface upon which is supported said clip and the support surface of said projecting surface portion projects from the closed cross-section portion toward the outside in the vehicle width direction.

13. The molding mounting structure of a vehicle door sash according to claim 1 wherein said clip comprises a contact surface and said projection surface portion includes a contact surface which is placed in contact with the contact surface of said clip, and the contact surface of said projection surface portion projects from the closed cross-section portion toward the outside in the vehicle width direction, and the contact surface of said clip extends in a common direction as the contact surface of said projection surface portion.

14. A molding mounting structure of a vehicle door sash, comprising:
a door sash that extends along an edge portion of a vehicle door window glass and has a closed cross-section portion and a projecting surface portion that projects from the closed cross-section portion toward the outside in the vehicle width direction;
a molding that extends substantially along the door sash and is arranged being exposed to the outside of the vehicle;
a clip that is fixed to the inner surface of the molding and nips the projecting surface portion of the door sash so as to fix the molding to the door sash,
wherein said clip comprises a contact surface and said projection surface portion includes a contact surface which is placed in contact with the contact surface of said clip, and the contact surface of said projection surface portion projects from the closed cross-section portion toward the outside in the vehicle width direction, and the contact surface of said clip extends in a common direction as the contact surface of said projection surface portion, and
wherein said clip comprises a flat plate that has a planar surface that defines the contact surface of said clip and said projection surface portion has a planar surface that defines the contact surface of said projection surface portion.

15. The molding mounting structure of a vehicle door sash according to claim 14,
wherein said clip comprises a second planar surface, and said molding includes a planar surface that is in contact with the second planar surface of said clip.

16. The molding mounting structure of a vehicle door sash according to claim 1, wherein said clip and said door sash further include a locking device that comprises a projection in one of said clip and door sash and an opening which receives said projection in the other of said clip and door sash.

17. A molding mounting structure of a vehicle door sash, comprising:
a door sash that extends along an edge portion of a vehicle door window glass and has a closed cross-section portion and a projecting surface portion that projects from the closed cross-section portion toward the outside in the vehicle width direction;
a molding that extends substantially along the door sash and is arranged being exposed to the outside of the vehicle;
a clip that is fixed to the inner surface of the molding and nips the projecting surface portion of the door sash so as to fix the molding to the door sash,
wherein said clip and said door sash further include a locking device that comprises a projection in one of said clip and door sash and an opening which receives said projection in the other of said clip and door sash, and
wherein each of said clip and door sash has a plate component with respective contacting surfaces, and said projection of said locking device includes a bent portion provided by the plate component of one of said clip and door sash, and said opening includes a projection receiving hole formed in the other plate component of said clip and door sash.

18. The molding mounting structure of a vehicle door sash according to claim 16 further comprising a biasing member positioned between said clip and an outermost edge of said projecting surface portion as to bias against the locking state of said locking device.

19. The molding mounting structure of a vehicle door sash according to claim 1, wherein each of the clip and door sash has a plate component with respective contacting surface, and the engagement surface portion and the nipping portion extend from an outermost edge of the plate component of the clip.

20. The molding mounting structure of claim 4 wherein said concave portion includes a hole formed in the closed cross-section of said door sash.

21. The molding mounting structure of claim 1 wherein said clip comprises a plate, and said engagement surface portion and said nipping portion are bent portions of said plate that are separated longitudinally apart by a gap provided in said plate.

22. The molding mounting structure of claim 1 wherein said molding and engagement surface portion are engaged by an extension of said engagement surface portion into a recess provided in said molding.

\* \* \* \* \*